Oct. 2, 1934.    M. M. BORDEN    1,975,710
FLOW INDICATOR
Filed April 23, 1931
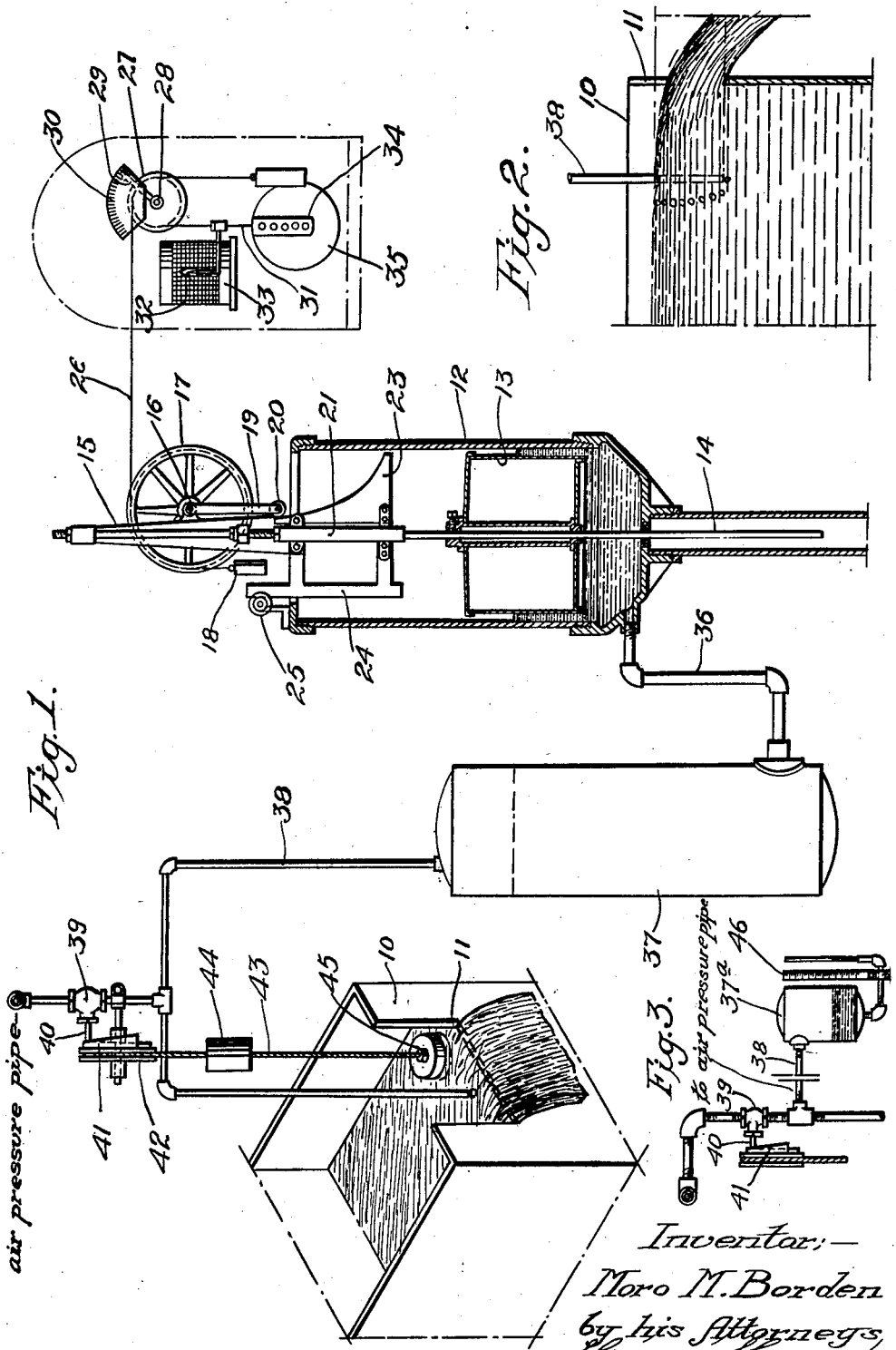
Inventor:—
Moro M. Borden
by his Attorneys
Howson & Howson Patented Oct. 2, 1934

1,975,710

UNITED STATES PATENT OFFICE 1,975,710

FLOW INDICATOR

Moro M. Borden, Philadelphia, Pa., assignor to Simplex Valve and Meter Company, Philadelphia, Pa., a corporation of Delaware Application April 23, 1931, Serial No. 532,350

2 Claims. (Cl. 73—167)

This invention relates to flow indicators, and more particularly to an apparatus for accurately indicating recording and totalizing a flow differentiating with differentiations in head of a fluid.

A further object of the invention is the improvement of my prior apparatus for use in this connection as illustrated in Patent No. 1,296,041, for Fluid meter, patented March 4, 1919.

A still further object of the invention is to provide an apparatus of this character which will afford an indication of the several functions at points remote to the point of flow which is being recorded.

These and other objects I attain by the construction shown in the accompanying drawing, wherein, for the purpose of illustration, I have shown a preferred embodiment of my invention and wherein:

Fig. 1 is a semi-diagrammatic view showing a flow indicator constructed in accordance with my invention;

Fig. 2 is a fragmentary detail sectional view showing the disposition of the flow submerged end of the pressure pipe with relation to the weir over which the flow is passing; and Fig. 3 is a fragmentary view showing the use of a different type of meter.

Referring now more particularly to the drawing, the numeral 10 generally designates a weir having a flow outlet 11, the flow through which is to be indicated, and recorded or totalized, or both recorded and totalized.

In accordance with my invention I provide a float chamber 12 having arranged therein a float 13 secured to a vertically guided rod 14. Upon a bracket 15, which may comprise one of the guides for the rod, I mount a shaft 16 having secured thereto a cable arm 17 at present disclosed as in the form of a complete wheel. Shaft 16 is likewise equipped with an arm 19 having at its free end a roller 20 for the purpose presently to appear. Vertically adjustably secured to rod 14 is a sleeve 21 having secured thereto a cam 23 and a vertically-extending guide arm 24 co-acting with a guide or backing roller 25. Cam 23 in the lowermost position of float 13 is co-acting with roller 20 of arm 19 and continues this co-action throughout the scope of movement of float 13, the roller being maintained in engagement with the cam through a counterweight of the indicating mechanism.

From the arm 17 indicating, recording or registering mechanism, or a combination of these features, may be actuated. In the present instance I have shown the arm 17 as connected through a cable 26 with a wheel 27 mounted on a shaft 28 which, likewise, bears a pointer 29 co-acting with a rod of flow dial 30. Wheel 27 likewise actuates a cable 31 from which are actuated a pen 32 operating over a chart on a rotating drum 33 and a totalizer 34. This totalizer may be of the general construction of that indicated in my prior patent above identified, comprising a friction-driven counter, the friction element of which is shifted by movements of the cable 31 over a friction disc 35. The means for rotating the friction disc 35 and drum 33 are not herein disclosed but may, likewise, be made in accordance with the aforementioned patent.

The bottom of casing 12 is in communication through conduit 36 with the lower end of a closed tank 37 containing a suitable liquid. The upper end of this tank is in communication with the conduit 38 having its terminal portion disposed in the fluid passing through weir 10 and the opening 11 and disposed at the level of the lower edge of this opening. Conduit 38 intermediate its ends is in communication with a suitable source of gaseous fluid under pressure, the available pressure being at all times slightly greater than that necessary to overcome the possible head against the outlet or submerged end of conduit 38 and the supply being at all times such that there is no tendency to artificially built-up pressures other than those caused by the head in the conduit 38.

Regulation of the supply may be obtained in several manners, one of which is indicated in the drawing in which conduit 38 is shown as in communication with the air pressure pipe through a valve 39, the stem 40 of which is rectilinearly movable to effect opening and closing of the valve. Associated with this valve is a rotatable cam 41 at present shown as secured to the side of a sheave 42 having a grooved periphery in which is secured and operates a cable 43 one end of which is attached to a counter-weight 44 and the opposite end of which is connected with a float 45. As float 45 rises and falls in response to head variations in weir 10, the valve is opened and closed by co-action of cam 41 with stem 40 thus at all times maintaining a suitable flow to conduit 38.

It will be obvious that with variations of head in weir 10 there will be corresponding variations of pressure in conduit 38 and in the tank 37 resulting in varying displacements of the liquid contained in tank 37 and a corresponding rise and fall of the liquid level in casing 12 with accompanying movements of float 13, rod 14 and cam 23. By properly proportioning arms 17 and 19 and the cam, the movement imparted to indicator 29 the chart, pen 32 and register 34 will obviously be proportionate to the flow in its changes.

Apparatus of this character permits accurate indication, recording and totalizing at a remote point at a relatively low cost and with an apparatus which may be very cheaply manufactured and very readily maintained in operation since it is extremely simple in its construction. Obviously, other types of gauges may be employed as suggested in Fig. 3 wherein I have disclosed means for correlating the displaced water or other liquid ejected from the tank 37—a with a fixed scale 46. By the use of either apparatus an accurate reproduction of the identical water head at the weir may be duplicated at either a higher or a lower elevation and at a distance and may be utilized to indicte the flow rate at the weir by operation of a measuring means.

Since the construction illustrated is obviously capable of modification and rearrangement without in any manner departing from the spirit of my invention, I do not wish to be understood as limiting myself thereto except as hereinafter claimed.

I claim:

1. In apparatus for indicating flow, two chambers communicating at their lower ends and containing a liquid, an indicator operated by the liquid level in one chamber, the other chamber being closed, a conduit communicating at one end with the last chamber, said conduit having its opposite end open and submerged in the liquid the flow of which is to be indicated, a source of fluid in constant communication with said conduit and means controlled by the head of said flow for varying the amount of fluid under pressure delivered from said source.

2. In indicating apparatus of the type described, a closed chamber, a second chamber communicating at its lower end with the lower end of the first-named chamber, a liquid in said chambers, an indicator operated by the liquid level in the second chamber, a source of gaseous fluid under pressure communicating with the first-named chamber and with the liquid the head of which is to be indicated through a conduit having its end immersed in the liquid the head of which is to be indicated, and means controlling the supply of fluid to said conduit by the head of the liquid the head of which is to be indicated, comprising a valve controlling communication between the conduit and the source of gaseous fluid under pressure, a float moving with variations in the head of the liquid to be indicated and a cam controlled by said float and controlling said valve.

MORO M. BORDEN.